(12) United States Patent
Urai et al.

(10) Patent No.: US 6,487,042 B2
(45) Date of Patent: Nov. 26, 2002

(54) THIN-FILM MAGNETIC HEAD AND MAGNETIC STORAGE APPARATUS USING THE SAME

(75) Inventors: Haruo Urai, Tokyo (JP); Shinsaku Saitho, Tokyo (JP); Tamaki Toba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/006,445

(22) Filed: Nov. 16, 2001

(65) Prior Publication Data

US 2002/0044381 A1 Apr. 18, 2002

Related U.S. Application Data

(62) Division of application No. 09/335,001, filed on Jun. 17, 1999, now abandoned.

(30) Foreign Application Priority Data

Jun. 19, 1998 (JP) .............................................. 10-173304

(51) Int. Cl.$^7$ ............................................... G11B 5/147
(52) U.S. Cl. ...................................................... 360/126
(58) Field of Search ................................ 360/126, 119, 360/123

(56) References Cited

U.S. PATENT DOCUMENTS 6,018,862 A * 2/2000 Stageberg et al. .......... 360/126
6,104,576 A * 8/2000 Santini ....................... 360/126

FOREIGN PATENT DOCUMENTS

JP 59-121611 * 7/1987

* cited by examiner

*Primary Examiner*—Robert S. Tupper
(74) *Attorney, Agent, or Firm*—Hayes Soloway PC

(57) ABSTRACT

To prevent the high-frequency characteristic from deteriorating due to a narrow track. A thin-film magnetic head of the present invention is produced by forming a lower shielding layer, a read gap layer holding an MR magnetosensitive element facing to an ABS plane, a shared pole layer serving as an upper shielding layer and a lower pole layer, and a write gap layer laminated in order on an insulating substrate, by forming a first flattening layer, a coil pattern layer, and a second flattening layer laminated in order on the write gap layer excluding the vicinity of the ABS plane, and by forming an upper pole layer on the write gap layer and second flattening layer nearby the ABS plane. Because magnetic easy axis of the upper pole layer along the ABS plane is oriented in the thickness direction of the upper pole layer, the high-frequency characteristic in the magnetization rotation mode is obtained.

6 Claims, 14 Drawing Sheets

(⊙,⊗,← : Magnetizing direction
------- : Magnetic domain wall)

*FIG. 11* - PRIOR ART $\begin{pmatrix} \longleftarrow & : \text{Magnetizing direction} \\ \text{-----} & : \text{Magnetic-domain wall} \end{pmatrix}$ $$\left(\begin{array}{l}\longleftarrow : \text{Magnetizing direction} \\ \text{-------} : \text{Magnetic-domain wall}\end{array}\right)$$

THIN-FILM MAGNETIC HEAD AND MAGNETIC STORAGE APPARATUS USING THE SAME

This application is a Div. of Ser. No. 09/335,001 filed Jun. 17, 1999, abandoned.

BACKGROUND OF THE INVENTION

1. Field of the Invention

The present invention relates to an inductive-type thin-film magnetic head and a magnetic storage apparatus using the magnetic head.

2. Description of the Prior Art

The recording density of a hard disk drive has been remarkably improved. The recording density from 1990 downward tends to rise at an annual rate of approx. 60%. To improve the recording density of a hard disk drive, it is necessary to improve the recording track density by decreasing the track width of a magnetic head. Moreover, to improve the recording density, it is also important to improve the recording bit density. To improve the recording bit density, it is necessary to increase the coercive force (Hc) of a magnetic storage medium. Moreover, to write data in a high-Hc magnetic storage medium, an inductive recording head having a high recording capacity is necessary. Furthermore, to efficiently detect a signal output from a micro-scaled recording bit, an MR reproducing head is necessary. Therefore, an MR-inductive composite-type thin-film magnetic head constituted by combining an MR reproducing head with an inductive recording head is prospective for high-density recording.

FIG. 11 is a sectional view showing a conventional thin-film magnetic head. The thin-film magnetic head will be described below by referring to FIG. 11.

The conventional thin-film magnetic head 70 is produced by forming a lower shielding layer 74, a read gap layer 80 holding an MR magnetosensitive element 78 facing to an ABS plane 76, a shared pole layer 82 serving as an upper shielding layer and a lower pole layer, and a write gap layer 84 laminated in order on an insulating substrate 72; by forming a first flattening layer 86, a coil pattern layer 88, and a second flattening layer 90 laminated in order on the write gap layer 84 excluding the vicinity of the ABS plane 76; and by forming an upper pole layer 92 on the write gap layer 84, first flattening layer 86, and second flattening layer 90 nearby the ABS plane 76.

The shared pole layer 82 serves as an upper shielding layer for improving the reproducing resolution of an MR reproducing head and a lower pole layer of an inductive recording head. The MR magnetosensitive element 78 detects a signal magnetic field outputted from a not-illustrated magnetic storage medium facing to the ABS plane 76. The thickness of the write gap layer 84 serves as the gap of the inductive recording head. The first flattening layer 86 serves as the insulating base of the coil pattern layer 88 and the second flattening layer 90 smoothens the irregularity in height of the coil pattern layer 88. A portion on the write gap layer 84 nearby the ABS plane 76 where there is no first flattening layer 86 determines the gap depth D of an inductive recording head. A recording track width is determined by the front end portion width W (not illustrated) of the upper pole layer 92. The front end portion width W represents the width of the upper pole layer 92 along the ABS plane 76 (front end) in the direction vertical to the drawing plane, which is shown in FIG. 2 or the like.

To improve the recording capacity for high-density recording, it is preferable to set the gap depth D to a small value of approx. 1 [micron meter] or less. Moreover, to correspond to high-density recording, it is preferable to realize an upper pole layer 92 having a minimum front end portion width W. Furthermore, because a recording/reproducing data transfer rate is raised as a recording density (particularly, linear recording density) rises, a high speed recording capacity is required for a magnetic head for high-density recording.

Moreover, Japanese Patent Application Laid-Open No. 4-285711 discloses an invention for accurately forming a very-small-width magnetic-pole front end portion of a magnetic recording/reproducing thin-film magnetic head. Specifically, the front end portion of a lower magnetic pole and that of an upper magnetic pole are simultaneously formed on a lower magnetic-pole layer, gap layer, and upper magnetic-pole layer formed on a substrate through simultaneous ion etching by using a mask corresponding to the shape of a magnetic-pole front end portion. Then, a thin-film coil and an insulating film are formed to form the rear of an upper magnetic pole.

Furthermore, Japanese Patent Application Laid-Open No. 7-192222 discloses a thin-film magnetic head capable of effectuating a high-density recording/reproducing characteristic and an overwriting characteristic for data write. In this case, among gaps formed on a pole portion, a pole front end portion is formed into a narrow gap and the innermost side of the pole portion is formed into a wide gap g2.

Furthermore, Japanese Patent Application Laid-Open No. 9-237407 discloses a thin-film magnetic head capable of realizing higher density recording by reducing the number of magnetic fields generated at the lateral side of a magnetic pole and controlling the write spread and moreover, controlling the eddy-current loss when raising a recording frequency. In this case, the cross section of an upper magnetic pole is formed into a trapezoid and the major side is set so as to face a lower magnetic pole (upper shielding layer). Moreover, an upper magnetic pole is formed into a two-layer structure, the first layer of a lower magnetic pole is formed of a magnetic material having a large residual flux density, magnetic permeability, and resistivity (e.g. FeN, FeNZr, or FeNNb) and the second layer of it is formed of permalloy.

BRIEF SUMMARY OF THE INVENTION

OBJECT OF THE INVENTION

The first problem is that a pattern accuracy enough to decrease a gap depth D and a front end portion width W is not obtained. The first problem will be described below in detail using FIG. 1.

To form a necessary gap depth D, the first flattening layer 86, which defines the gap depth D, must be considerably nearing the ABS plane 76. Therefore, the conventional thin-film magnetic head 70 had the following problem in order to form a resist frame pattern (not illustrated) for forming the upper pole layer 92 through the frame plating method.

The first flattening layer 86, coil pattern layer 88, and second flattening layer 90 are laminated in order and then, a resist frame pattern is formed. In this case, a large height difference is formed between the write gap layer 84 and the second flattening layer 90 at the front end portion. Therefore, the film thickness of the resist frame pattern at the front end portion becomes 10 (micron meter) or more and thereby, the accuracy for forming a thin pattern through photo lithography process is deteriorated. Moreover, front end sides of the first flattening layer 86 and second flattening layer 90 are respectively formed like a curved surface. Therefore, light for exposure in photo lithography process reflects on the curved surface and thereby, the vicinity of the ABS plane 76 of the resist frame pattern is easily overexposed.

As a result, the resist frame pattern for forming the front end portion of the upper pole layer 92 has a large film thickness and it is partially overexposed. Thereby, a narrow track pattern cannot be obtained. Thus, to obtain a preferable gap depth D, it is difficult to obtain a preferable front end portion width W.

The second problem is that the high-frequency characteristic is deteriorated to decrease the front end portion width W, that is, the track width. The second problem is described below in detail.

FIGS. 12(a) and 12(b) are illustrations showing magnetic domains of magnetic thin films. FIG. 13 is a graph showing the frequency dependency of the magnetic permeability of a magnetic thin film. The second problem will be described below by referring to FIG. 11 to FIG. 13.

The frequency response of the recording/reproducing characteristic of the thin-film magnetic head 70 greatly depends on the shape of the recording-pole magnetic domain of the head 70. As shown in FIGS. 12(a) and 12(b), the magnetic permeability of a sheet-like magnetic thin film 100 greatly depends on the direction of magnetic easy axis 102 of the magnetic thin film 100 and the direction of an externally applied signal magnetic field 110. The magnetic domain structure in the magnetic thin film 100 has closure domain structure in which a magnetic domain 106a having a magnetizing direction 104a parallel with magnetic easy axis 102 occupies the most part and a triangular magnetic domain 106b having a magnetizing direction 104b vertical to magnetic easy axis 102 is adjacent to the magnetic domain 106a so that a magnetic field does not exit to the end of a magnetic thin-film pattern. The boundary between the magnetic domains 106a and 106b is a magnetic domain wall 108.

As shown in FIG. 12(a), the case in which magnetic easy axis 102 is perpendicular to the signal magnetic field 110 is referred to as "magnetization rotation mode." As shown in FIG. 12(b), the case in which magnetic easy axis 102 is parallel with the signal magnetic field 110 is referred to as "magnetic-domain-wall moving mode." As shown in FIG. 13, the magnetization rotation mode is superior to the magnetic domain wall mode in high-frequency characteristic by approx. order of two. This is because the rotational speed of magnetization is higher than the moving speed of a magnetic domain wall by order of two to three.

The above mentioned, a conventional-thin-film magnetic head is shown in FIG. 6.29 (p. 6.34) and FIG. 6.30 (p. 6.35) of "Magnetic Recording Technology, Second Edition (issued in 1996)" edited by C. D. Mee and E. D. Daniel, issued by MacGraw Hill, Inc., wherein a magnetic domain structure has a magnetic anisotropy vertical to a signal magnetic field and the magnetizing direction vertical to the signal magnetic field at the front end portion of a recording pole.

FIGS. 14(a) and 14(b) are illustrations showing the magnetic domain structure of a conventional thin-film magnetic head, in which FIG. 14(a) is a plan view and FIG. 14(b) is a front view. FIGS. 15(a) and 15(b) are illustrations showing the magnetic domain structure of a conventional thin-film magnetic head for narrow tracks, in which FIG. 15(a) is a plan view and FIG. 15(b) is a front view. The magnetic domain structures are described below by referring to FIGS. 11, 14, and 15.

As shown in FIGS. 14(a) and 14(b), in a thin-film magnetic head 70, magnetic domain structures of a shared pole layer 82 and an upper pole layer 92 are formed so that magnetic easy axis 102 is perpendicular to a signal magnetic field 110. Thereby, a magnetization rotation mode is realized.

As shown in FIGS. 15(a) and 15(b), however, when the recording track width decreases, a magnetizing direction is set along the pattern end at the front end portion of the upper pole layer 92 even if magnetic easy axis 102 is vertical to the signal magnetic field 110 in order to prevent the number of demagnetization fields at the pattern end from increasing. With the magnetic domain structure having the front end portion of the upper pole layer 92 described above, the response of magnetization for the signal magnetic field 110 becomes the magnetic-domain-wall moving mode and thereby, the high-frequency characteristic is deteriorated.

SUMMARY OF THE INVENTION

Therefore, it is an object of the present invention to provide a thin-film magnetic head capable of accurately decreasing a gap depth D and a front end portion width W without deteriorating any high-frequency characteristic due to decrease of a track width and to provide a magnetic storage apparatus using the thin-film magnetic head.

A thin-film magnetic head of the present invention is produced by forming a lower pole layer, a write gap layer, and an upper pole layer laminated in order along an ABS plane. Moreover, the upper pole layer is configured from a front end portion facing to the ABS plane and a yoke portion connected to the front end portion through a junction, magnetic easy axis of the front end portion on the ABS plane is oriented in the film thickness direction of the front end portion. Magnetic easy axis of the front end portion of the upper pole layer is vertical to a signal magnetic field because the axis is oriented in the film thickness direction of the front end portion. Therefore, the recording frequency response is dominated by the magnetization rotation mode.

The thin-film magnetic head in claim 2 is produced by forming a lower pole layer, a first flattening layer, a coil pattern layer, and a second flattening layer laminated in order on the write gap layer excluding the vicinity of an ABS plane, and by forming an upper pole layer on the write gap layer nearby the ABS plane. Moreover, the upper pole layer is configured from a front end portion facing to the ABS plane and a yoke portion connected to the front end portion through a junction, magnetic easy axis of the front end portion on the ABS plane is oriented in the film thickness direction of the front end portion, a concave portion is formed in the lower pole layer at a position separated from the ABS plane, the concave portion is filled with a nonmagnetic material, and the gap depth between the upper pole layer and the lower pole layer is determined by the concave portion.

The gap depth is determined not by the distance from the ABS plane to the front end of the first flattening layer but by the distance from the ABS plane to the margin of the concave portion. Because the concave portion is formed in a flat lower pole layer, no problem occurs in the photolithography process for forming the concave portion. Moreover, a resist frame pattern for forming the front end portion of the upper pole layer is not increased in film thickness or it is not overexposed because the first flattening layer can be sufficiently separated from the ABS plane. Therefore, it is possible to decrease the width of the front end portion of the upper pole layer. Even if decreasing the width, the frequency response for recording becomes the magnetization rotation mode because of the above reason.

The thin-film magnetic head in claim 3 is produced by forming a lower shielding layer, read gap layer holding an MR magnetosensitive element facing to an ABS plane, a shared pole layer serving as an upper shielding layer and a lower shielding layer, and write gap layer laminated in order on an insulating substrate, by forming a first flattening layer, a coil pattern layer, and a second flattening layer laminated in order on the write gap layer, and by forming an upper pole layer on the write gap layer at least nearby the ABS plane. Moreover, the upper pole layer is configured of a front end portion facing to the ABS plane and a yoke portion connected to the front end portion through a junction, magnetic easy axis of the front end portion on the ABS plane is oriented in the film thickness direction of the front end portion, a concave portion is formed on the shared pole layer at a position separated from the ABS plane, the concave portion is filled with a nonmagnetic material, and the gap depth between the upper pole layer and the lower pole layer is determined by the concave portion. That is, the thin-film magnetic head of claim 3 is an MR-inductive composite-type thin-film magnetic head constituted by combining an MR reproducing head with an inductive recording head.

Thin-film magnetic heads in claims 4 to 19 are respectively configured by restricting some of the components of the thin-film magnetic head in claim 1, 2, or 3. Magnetic storage apparatus in claims 20 to 25 are respectively configured by using the thin-film magnetic head in claim 1, 2, or 3.

The thin-film magnetic head in claim 4 uses the thin-film magnetic head in claim 3 in which the MR magnetosensitive element is the GMR type. The GMR magnetosensitive element is produced by forming of a Ta film (3 nm), an NiFe film (8 nm), a CoFe film (1 nm), a Cu film (2.5 nm), a CoFe film (3 nm), and NiMn film (30 nm) laminated in order on the lower shielding layer side. The MR magnetosensitive element has a magneto-resistance ratio of approx. 5% that is approx. two times larger than that of a conventional MR magnetosensitive component and therefore, suitable for a narrow-track high-density reproducing magnetic head.

As for the thin-film magnetic head in claim 5, the lower shielding layer of the thin-film magnetic head of claim 3 is formed through the sputtering method. The lower shielding layer, for example, is formed by forming an amorphous CoTaMo film through sputtering and heat-treating the film in an anisotropy-providing magnetic field at 350 [degrees centigrade], and then forming a shielding pattern shape through ion milling. When the lower shielding layer uses a sputtered film, the surface of the film is smoother than that of an NiFe film formed through the plating method because the crystal grain size is smaller than that of the NiFe film. Therefore, the characteristic of an MR magnetosensitive element formed on the lower shielding layer is improved.

The thin-film magnetic head in claim 6 uses the thin-film magnetic head in claim 1, 2, or 3 in which the front end portion of the upper pole layer is made of a material having a saturation flux density of at least 1.6 T or more. This type of the material includes a CoFeNi-based material having a saturation flux density of 1.8 T or more. Therefore, it is possible to compensate decrease in recording magnetic field strength generated due to decrease of a recording track width and realize a magnetic head suitable for narrow-track recording.

As for the thin-film magnetic head in claim 1, 2, or 3, the film thickness of the front end portion on the ABS plane is assumed as t and the front end portion width vertical to the film thickness t is assumed as W. An inequality of t>W is effectuated for the thin-film magnetic head of claim 7 and an inequality of t>3 W is effectuated for the thin-film magnetic head of claim 8. When the inequality of t>W is effectuated, the shape anisotropy due to the difference between demagnetization fields is formed in the film thickness direction. To form magnetic easy axis due to the shape anisotropy in the film thickness direction, it is preferable that the inequality of t>3 W is effectuated when considering an intrinsic magnetic anisotropy and a strain induction anisotropy due to a stress of a pole height lapping or the like.

BRIEF DESCRIPTION OF THE DRAWINGS

FIG. 15(*a*) and FIG. 15(*b*) are illustrations showing the magnetic domain structure of a conventional thin-film magnetic head using a narrow track, in which FIG. 15(a) is a plan view and FIG. 15(b) is a front view.

DETAILED DESCRIPTION OF THE PREFERRED EMBODIMENTS

Embodiments of the present invention will be described below by referring to the accompanying drawings. However, the same portion in all drawings is provided with the same symbol and thereby, the duplicate description is omitted.

Figure 1:
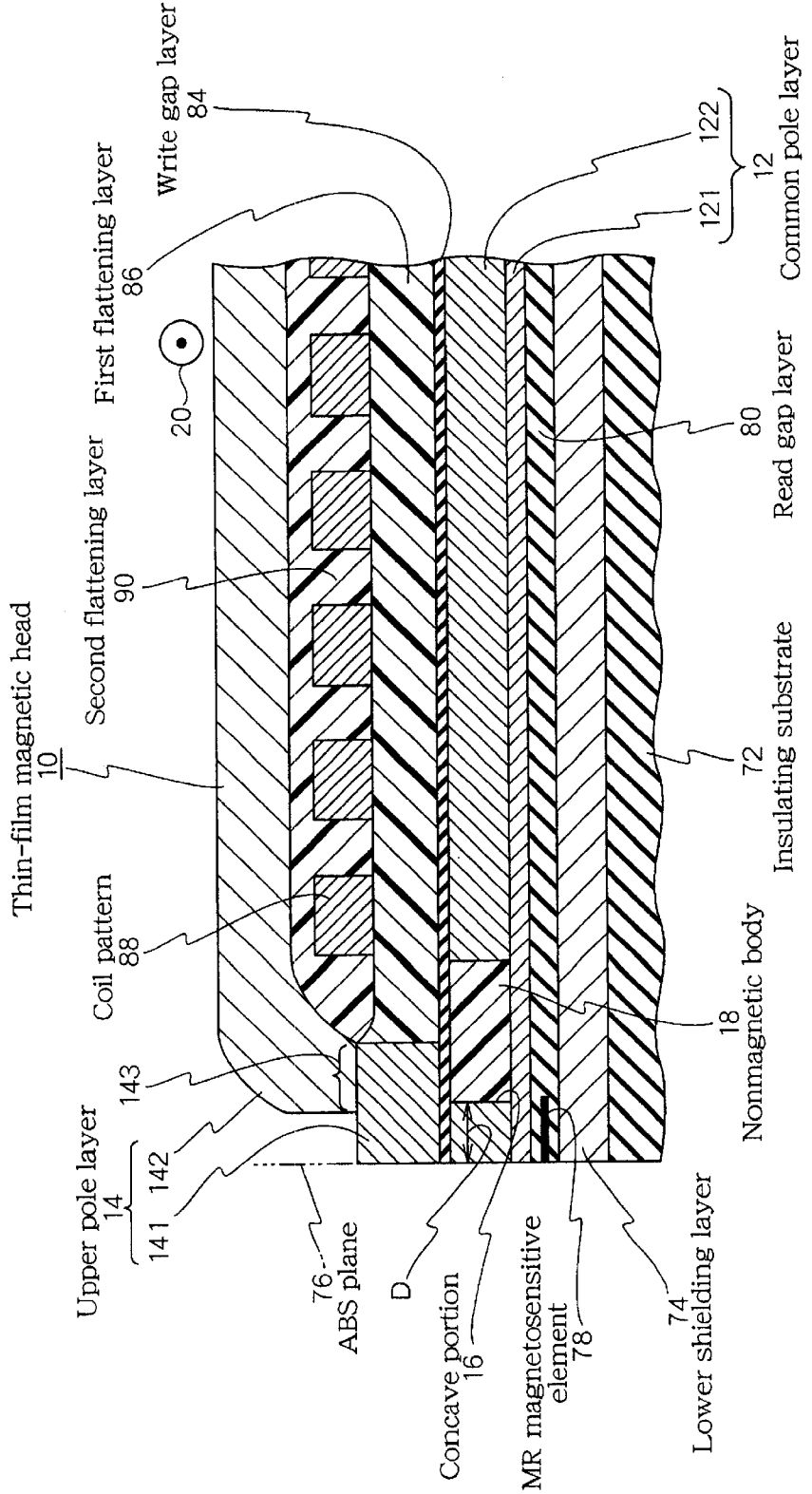
FIG. 1 is a sectional view showing a first embodiment of a thin-film magnetic head of the present invention, taken along the line I—I of FIG. 2.
Figure 2:
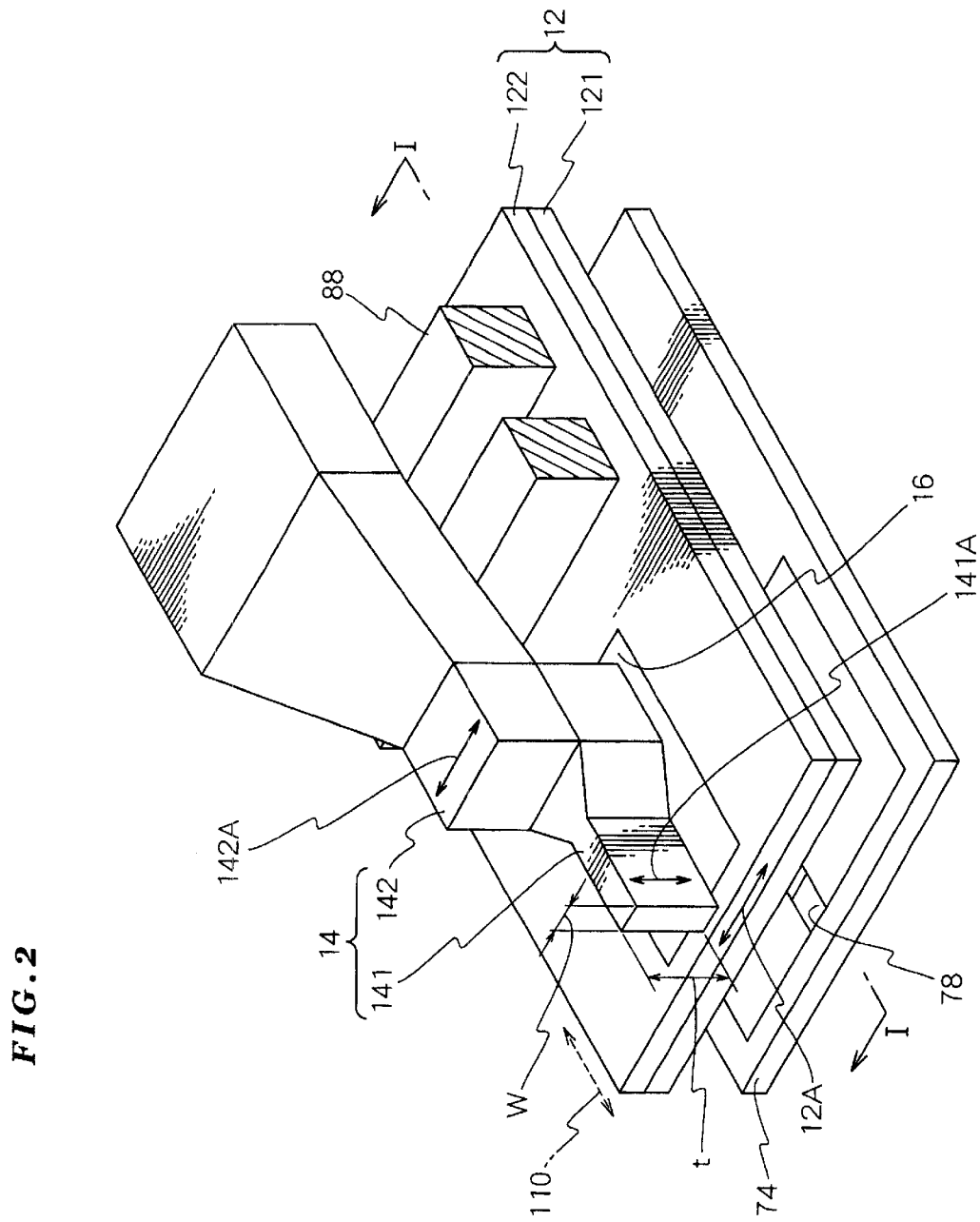
FIG. 2 is a partially-omitted perspective view showing the thin-film magnetic head of FIG. 1.

FIGS. 1 and 2 show a first embodiment (basic configuration) of a thin-film magnetic head of the present invention, in which FIG. 1 is a sectional view taken along the line I—I of FIG. 1 and FIG. 2 is a partially-omitted perspective view. The first embodiment will be described below by referring to FIGS. 1 and 2.

The thin-film magnetic head 10 of this embodiment is produced by forming a lower shielding layer 74, a read gap layer 80 holding an MR magnetosensitive element 78 at an ABS plane 76, a shared pole layer 12 serving as an upper shielding layer and a lower pole layer, and a write gap layer 84 laminated in order on an insulating substrate 72, by forming a first flattening layer 86, a coil pattern layer 88, and a second flattening layer 90 laminated in order on the write gap layer 84 excluding the vicinity of the ABS plane 76, and by forming an upper pole layer 14 on the write gap layer 84 nearby the ABS plane 76 and the second flattening layer 90. Moreover, a concave portion 16 is formed in the shared pole layer 12 at a position separated from the ABS plane 76, the concave portion 16 is filled with a nonmagnetic material 18, and the depth D of the gap between the upper pole layer 14 and the shared pole layer 12 is determined by the concave portion 16. FIG. 1 shows the gap depth D and FIG. 2 shows a front end portion width W.

An MR reproducing head is configured of the MR magneto sensitive element 78, lower shielding layer 74, read gap layer 80, and shared pole layer 12 serving as an upper shielding layer. An inductive recording head is configured of the shared pole layer 12 serving as a lower pole layer, write gap layer 84, first flattening layer 86, coil pattern layer 88, second flattening layer 90, and upper pole layer 14. The shared pole layer 12 is configured of a lower pole layer 121 and an upper shared pole layer 122 and the concave portion 16 is formed through a part of the shared pole layer 122. The upper pole layer 14 is configured of a front end portion 141 facing to the ABS plane 76 and a yoke portion 142 connected to the front end portion 141. The front end portion 141 and the yoke portion 142 are connected each other by a junction 143. The nonmagnetic material 18 made of resist is flatly embedded in the concave portion 16. The surface of the shared pole layer 122 is flush with that of the nonmagnetic material 18. The front end portion 141 and the shared pole layer 12 are respectively made of a high-Bs material having a saturation flux density (Bs) of 1.4 to 2.1 T.

The gap depth D is determined not by the distance from the ABS plane 76 up to the front end of the first flattening layer 86 but by the distance from the ABS plane 76 up to the margin of the concave portion 16. The concave portion 16 is formed in the shared pole layer 12 serving as a flat lower pole layer. Therefore, no problem occurs in the photolithography technique for forming the front end portion 141. Moreover, a resist frame pattern (not illustrated) for forming the front end portion 141 is not increased in film thickness or it is not overexposed and therefore, a high-accuracy narrow track pattern is obtained because the first flattening layer 86 and the second flattening layer 90 can be greatly separated from the ABS plane 76.

Magnetic easy axis 12A of the shared pole layer 12 is substantially vertical to a signal magnetic field 110. Magnetic easy axis 141A of the front end portion 141 is substantially parallel with the film thickness direction (that is, vertical to the magnetic film plane). Magnetic easy axis 142A of the yoke portion 142 is vertical to the signal magnetic field 110 in the magnetic film plane. The film thickness t and the front end portion width W of the front end portion 141 have a relation of t>W.

Figure 4D:
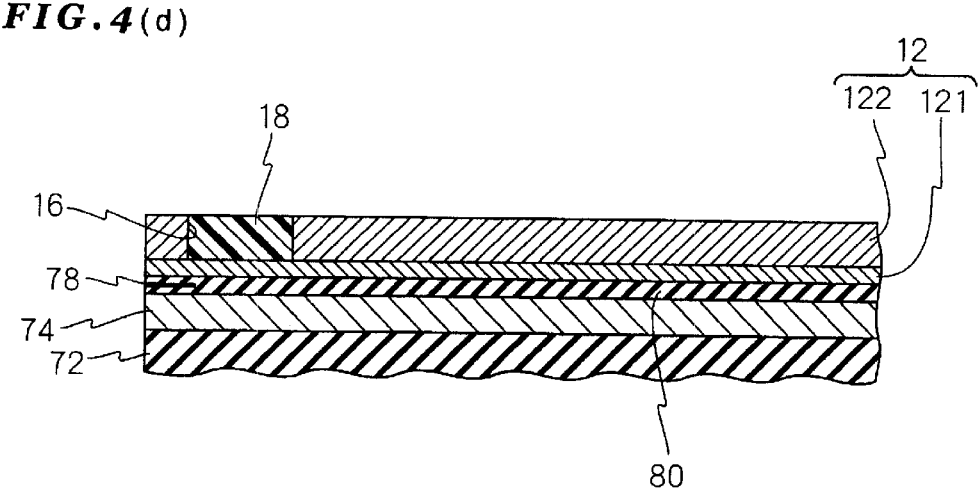
FIG. 4(*d*) to FIG. 4(*f*) are sectional views showing a method for fabricating the thin-film magnetic head of FIG. 1, in which processes advance from FIG. 4(*d*) to FIG. 4(*e*), and FIG. 4(*f*) in order.
Figure 4E:
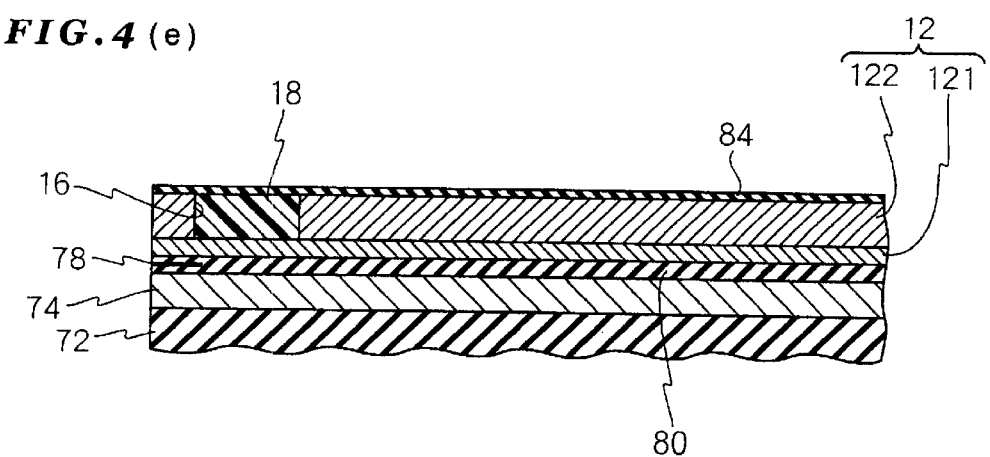
Figure 4F:
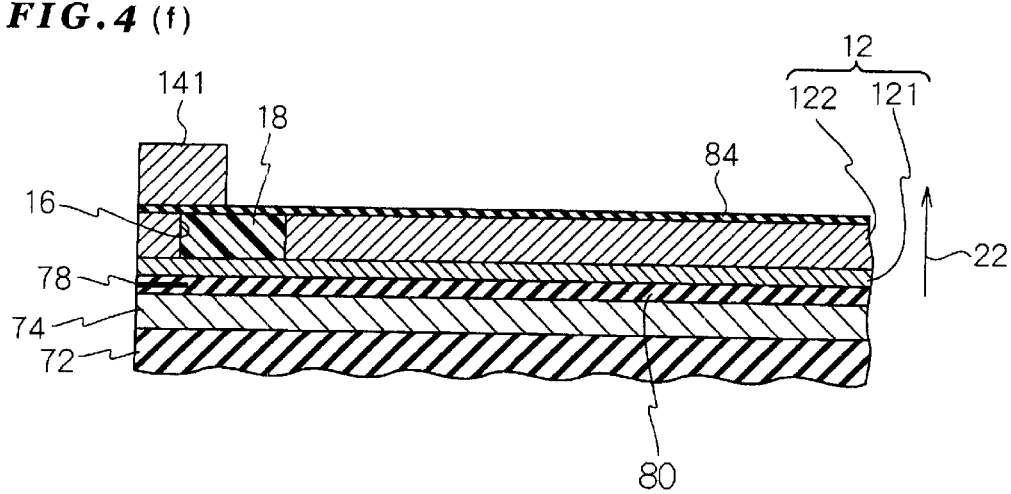
Figure 5:
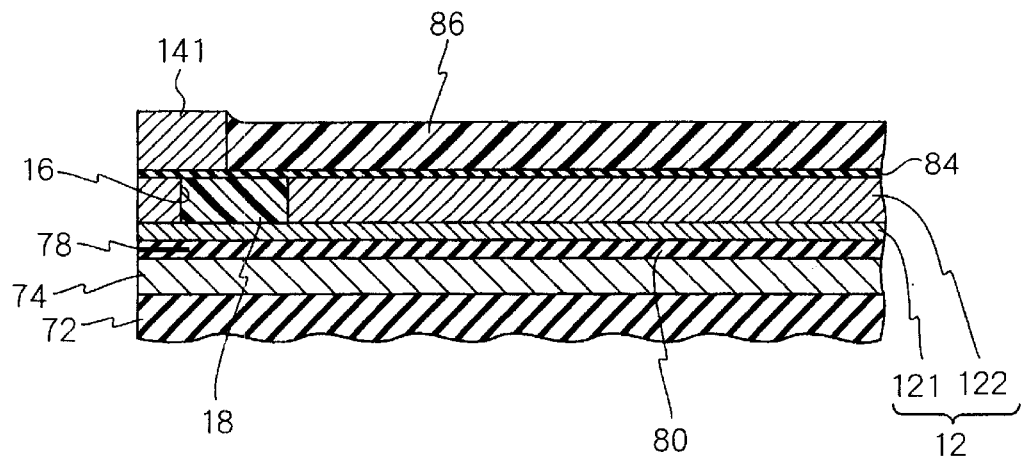
FIG. 5(*g*) to FIG. 5(*i*) are sectional views showing a method for fabricating the thin-film magnetic head of FIG. 1, in which processes advance from FIG. 5(*g*), FIG. 5(*h*), to FIG. 5(*i*) in order.
Figure 5:
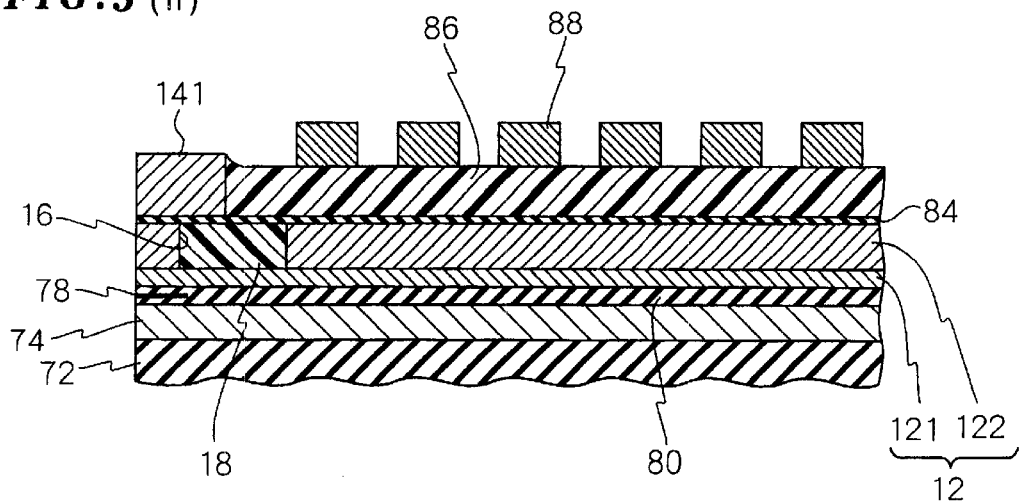
Figure 5:
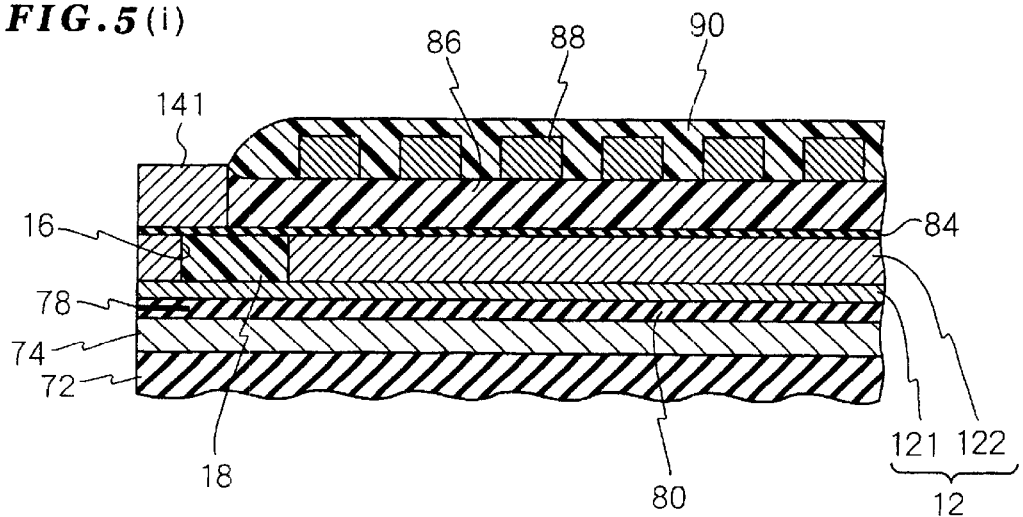

FIGS. 3 to 5 are sectional views showing an example of a method for fabricating the thin-film magnetic head of FIG. 1. These sectional views show a thin-film magnetic head cut along the center of the recording track width similarly to the case of FIG. 1. The method for fabricating the thin-film magnetic head of FIG. 1 is described below by referring to FIGS. 3 to 5.

Figure 3A:
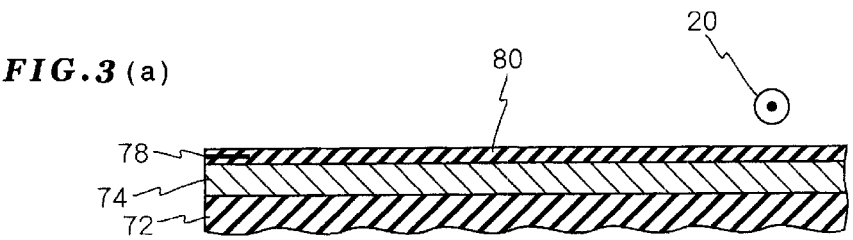
FIG. 3(*a*) to FIG. 3(*c*) are sectional views showing a method for fabricating the thin-film magnetic head of FIG. 1, in which processes advance from FIG. 3 (*a*) to FIG. 3(*b*), and FIG. 3(*c*) in order.

Process (a) . . . FIG. 3(a) First, an NiFe substrate film (not illustrated) is formed on an insulating substrate 72 configured from an $Al_2O_3$ insulating layer on an $Al_2O_3$—TiC ceramic substrate serving as a slider material through the plating method. Then, a certain resist pattern is formed in the exposing and developing process to form a lower shielding layer 74 configured of an NiFe plated film having a thickness of 2 "m through the plating method. Under the film formation through plating, an anisotropy-providing magnetic field 20 is previously applied at an intensity of approx. 100 Oe so that magnetic easy axis of the lower shielding layer 74 becomes vertical to a signal magnetic field in the film plane. Then, a resist frame is removed by an organic solvent and an NiFe substrate film is removed through the dry etching method. Processes for forming and removing a plated substrate film and removing resist are the same as the above in any processes and therefore, the description of the processes is omitted. Then, the lower portion of a read gap layer 80 configured of an $Al_2O_3$ film having a thickness of 100 nm is formed through the sputtering method to form an MR magnetosensitive element 78 for detecting a signal magnetic field from a magnetic storage medium. The MR magnetosensitive element 78 is a soft-adjacent-layer MR component having a three-layer structure configured of a CoZrMo layer (20 nm), a Ta layer (15 nm) , and an NiFe layer (20 nm). Moreover, the upper portion of the read gap layer 80 constituted of an $Al_2O_3$ film having a thickness of 80 nm is formed through the sputtering method.

Figure 3B:
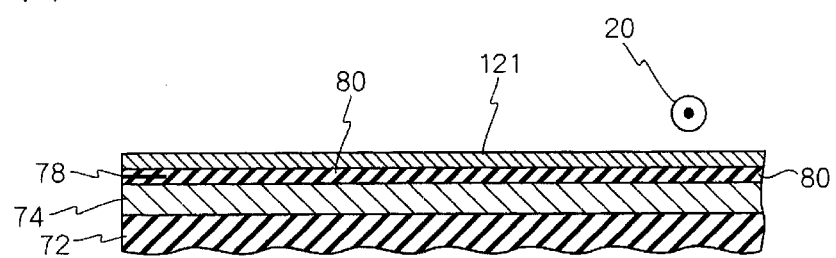

Process (b) . . . FIG. 3(b)

The resist frame pattern of a lower shared pole layer 121 is formed in the exposing and developing process to from a shared pole layer 121 configured of an NiFe plated film having a thickness of 1 [micron meter] through the frame plating method. Even during the formation of the film through plating, the anisotropy-providing magnetic field 20 used for the process (a) is applied.

Figure 3C:
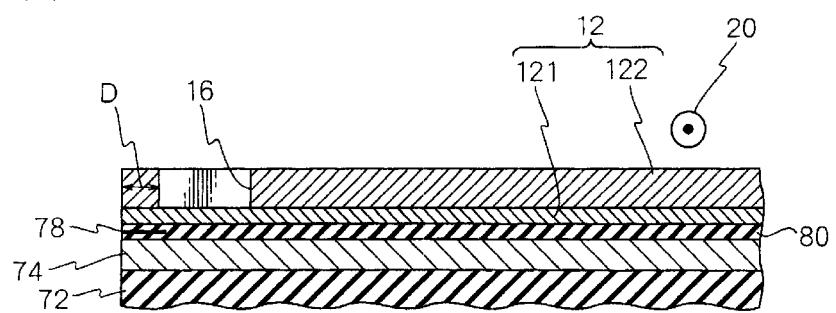

Process (c) . . . FIG. 3(c)

To flatly form a rectangular concave portion 16 for determining a gap depth D, a rectangular resist pattern is formed in the exposing and developing process to form an upper shared pole layer 122 configured of an NiFe plated film having a thickness of 1.5 [micron meter] through the plating method. Even during the formation of the film through plating, the anisotropy-providing magnetic field 20 used for the process (a) is applied. After plating is completed, the concave portion 16 is formed by removing the rectangular resist pattern.

Process (d) . . . FIG. 4(d) To embed a nonmagnetic material 18 made of resist in the concave-portion 16, a resist pattern having a film thickness 1.5 times larger than that of the shared pole layer 122 is formed in the exposing and developing process. Then, resist is softened through heat treatment at 100 to 120 [degrees centigrade] for 30 mins. by using an oven or hot plate to fill the inside of the concave portion 16 with resist. Then, the resist is thermally hardened at 250 to 270 [degrees centigrade] for 30 mins. At this point of time, the upper portion of the shared pole layer 122 and that of the resist become almost flat.

Process (e) . . . FIG. 4(e)

A write gap layer 84 is formed by forming an $Al_2O_3$ film having a thickness of 350 nm through the sputtering method.

Process (f) . . . FIG. 4(f)

To realize an upper pole layer 14 having a thickness of 4 [micron meter] and a track width (front end portion width W) of 1.2 [micron meter], a front end portion 141 configured of an NiFe plated film is formed through the frame plating method. During the formation of the film through plating, an anisotropy-providing magnetic field 22 vertical to the film plane is applied at an intensity of approx. 500 Oe to form magnetic easy axis of the front end 141 so as to be vertical to the film plane.

Process (g) . . . FIG. 5(g)

The resist pattern of a first flattening layer 86 having a thickness almost equal to that of the front end portion 141 is formed in the exposing and developing process. Then, resist is softened at 100 to 120 [degrees centigrade] for 30 mins. by using an oven or hot plate and moreover, it is thermally hardened at 250 to 270 [degrees centigrade] for 30 mins. to form the first flattening layer 86.

Process (h) . . . FIG. 5(h)

A certain shaped resist pattern is formed in the exposing and developing process in order to form a coil pattern 88 configured of a Cu plated film having a thickness of 3 [micron meter] through the plating method.

Process (i) . . . FIG. 5(i)

A resist pattern is formed into a certain shape in the exposing and developing process to form a second flattening layer 90. Then, resist is softened through heat treatment at 100 to 120 [degrees centigrade] for 30 mins. by using an oven or hot plate and moreover, it is thermally hardened at 250 to 270 [degrees centigrade] for 60 mins.

Process (j) . . . FIG. 1

A resist frame pattern for forming a yoke portion 142 is formed in the exposing and developing process so that the yoke portion 142 overlaps with a junction 143 at the back of the front end portion 141. Then, a yoke portion 142 configured of an NiFe film having a thickness of 3 [micron meter] equal to that of the front end portion 141 is formed through the frame plating method. During the formation of the film through plating, the anisotropy-providing magnetic field 20 used for the process (a) is applied.

Figure 6:
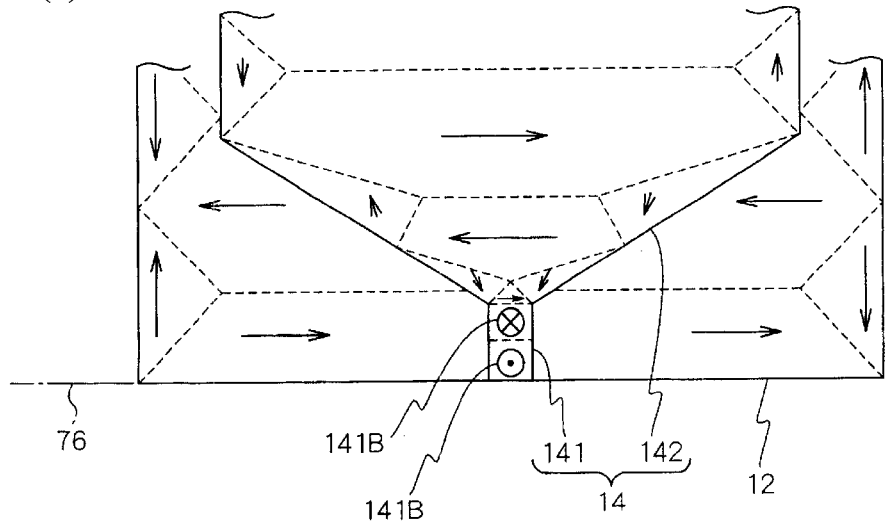
FIGS. 6(*a*) to 6(*c*) are illustrations showing the magnetic domain structure of the thin-film magnetic head of FIG. 1, in which FIG. 6(*a*) is a top view, FIG. 6(*b*) is a front view, and FIG. 6(*c*) is a side view.
Figure 6:
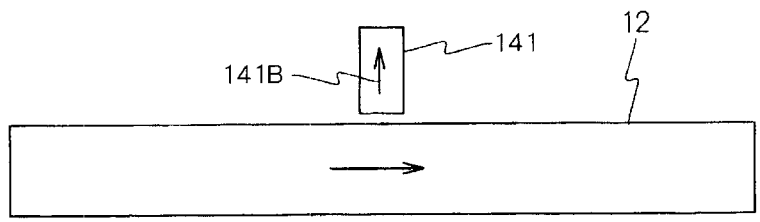
Figure 6:
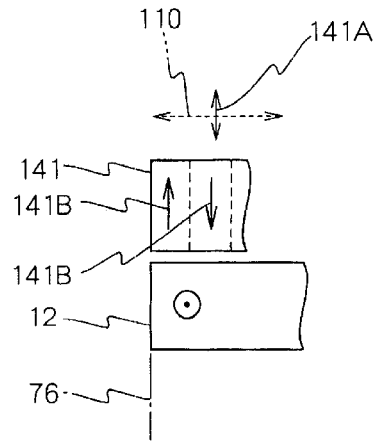

FIGS. 6(a) to 6(c) are illustrations showing the magnetic domain structure of the thin-film magnetic head 10, in which FIG. 6(a) is a plan view, FIG. 6(b) is a front view, and FIG. 6(c) is a side view. Operations of the thin-film magnetic head 10 will be described below by referring to FIGS. 6(a) to 6(c).

Figure 12:
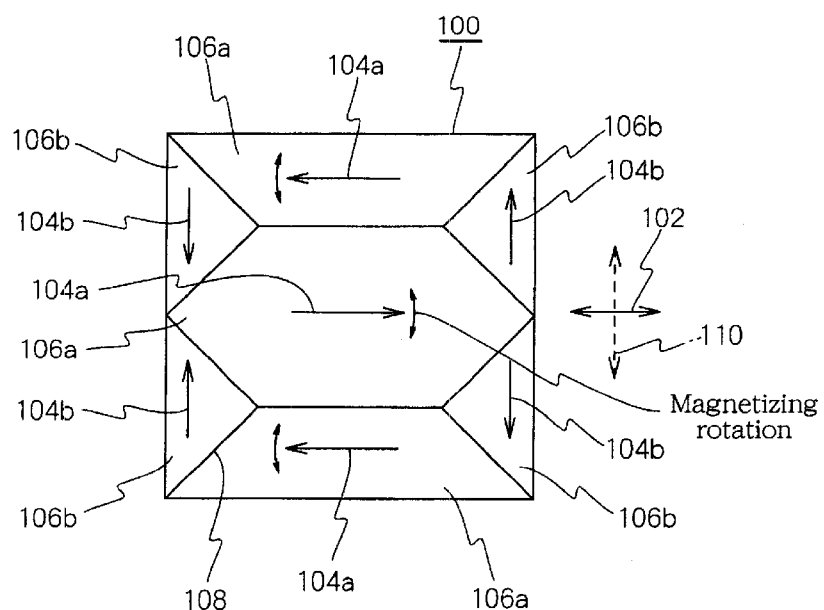
FIG. 12(*a*) and FIG. 12(*b*) are illustrations showing the magnetic domain structure of a magnetic thin film, in which FIG. 12(*a*) is a magnetization rotation mode and FIG. 12(*b*) is a magnetic-domain-wall moving mode.
Figure 12:
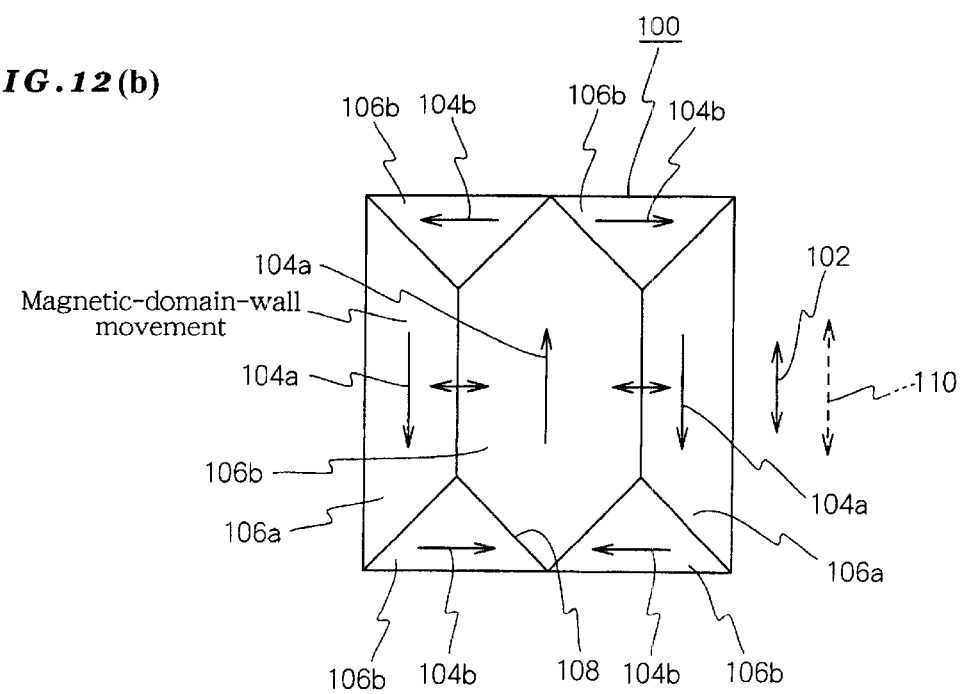
Figure 13:
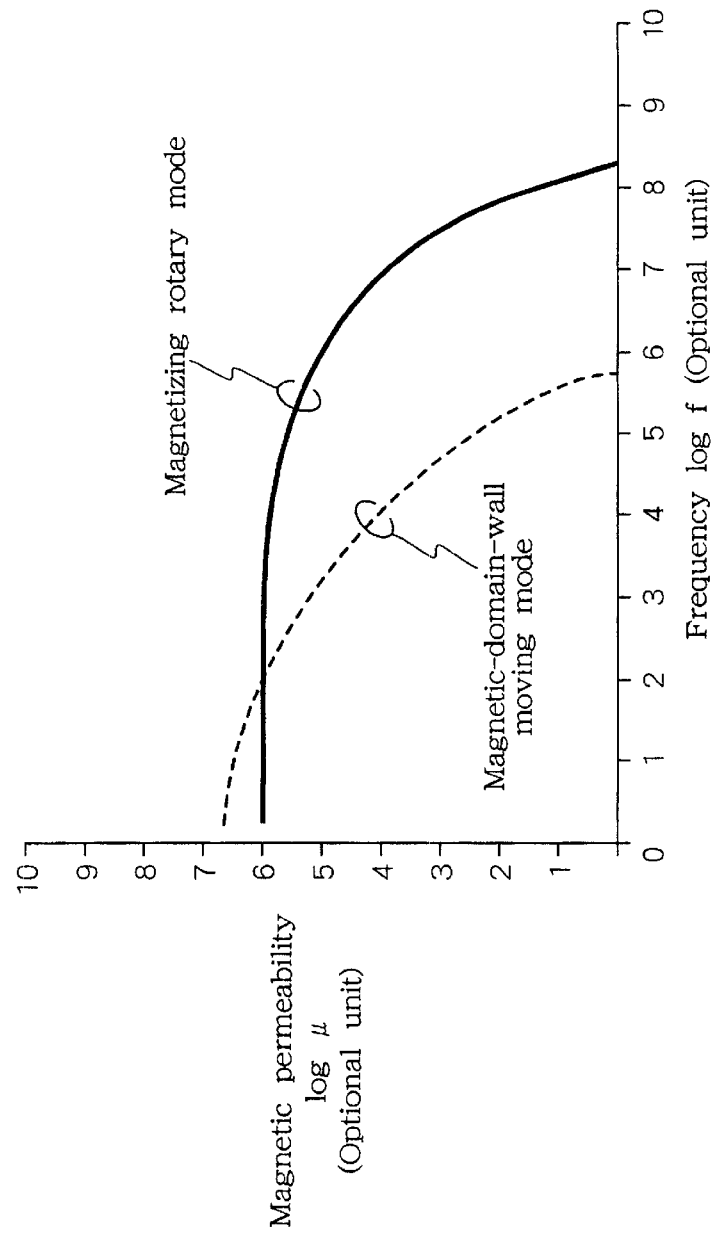
FIG. 13 is a graph showing the frequency dependency of the magnetic permeability of a magnetic thin film.
Figure 14A:
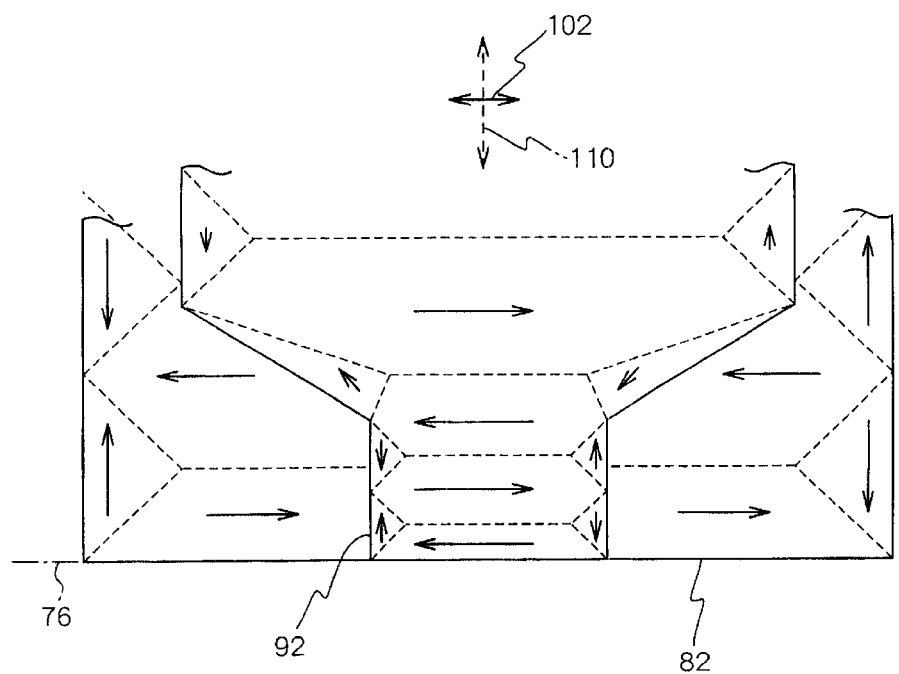
FIG. 14(*a*) and FIG. 14(*b*) are illustrations showing the magnetic domain structure of a conventional thin-film magnetic head, in which FIG. 14(*a*) is a plan view and FIG. 14(*b*) is a front view.
Figure 14B:
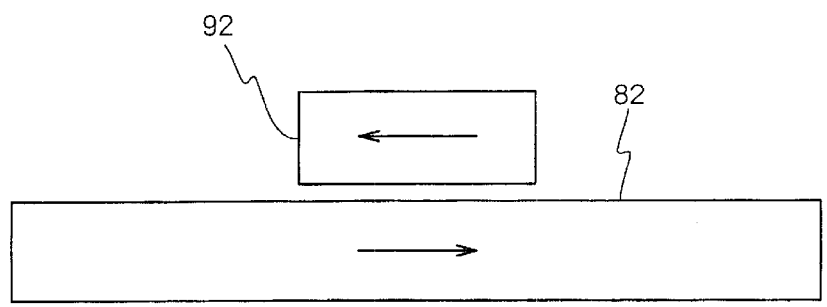
Figure 15:
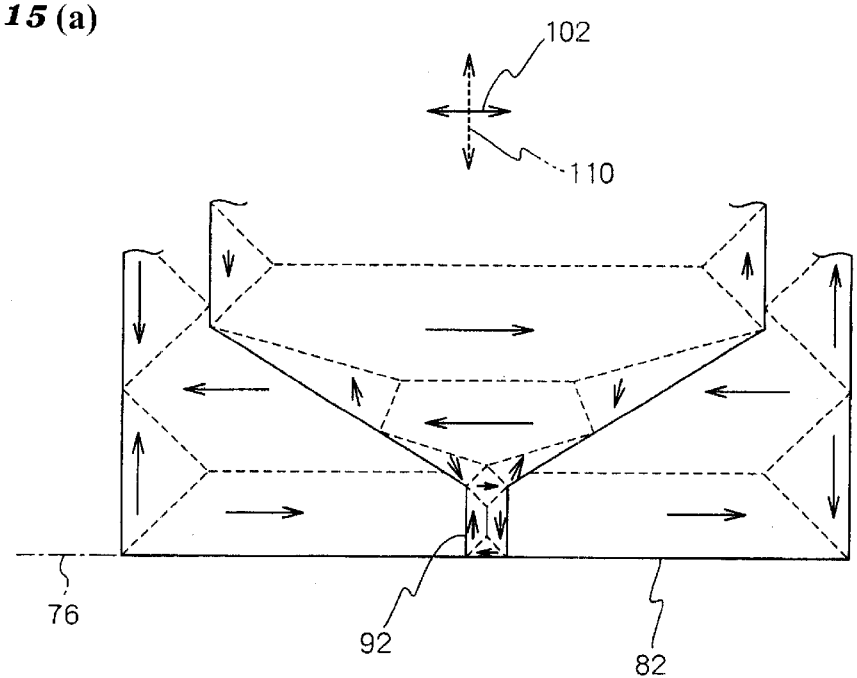
Figure 15:
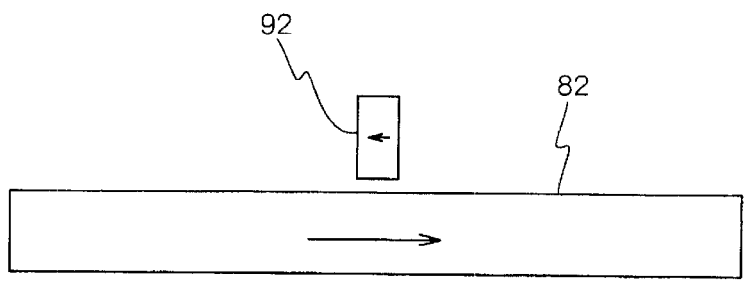

FIG. 6(c) shows magnetic easy axis 14 1A of the front portion 141 and a signal magnetic field 110. As shown in FIG. 6(a), the yoke portion 142 shows a magnetic domain structure equal to that of a conventional thin-film magnetic head. The front end portion 141 has a magnetic domain structure in a magnetizing direction 141B vertical to the film plane because the magnetic-anisotropy direction of the front end portion 141 is vertical to the film plane. When the signal magnetic field 110 is applied to the upper pole layer 14 having the above magnetic domain structure, the change of magnetization becomes the magnetization rotation mode shown in FIG. 12(a) because the magnetizing direction 141B of the front end portion 141 is vertical to the signal magnetic field 110.

An externally applied magnetic field has been used in explaining a signal magnetic field. However, when data is recorded by the actual thin-film magnetic head 10, a magnetic field (a induced magnetic field induced) to be applied to the upper pole layer 14 is generated by the current flowing through the coil pattern layer 88. It is needless to say that the magnetization response of the front end portion 141 to the excitation magnetic field is equal to the magnetization response due to an external signal magnetic field.

Figure 7:
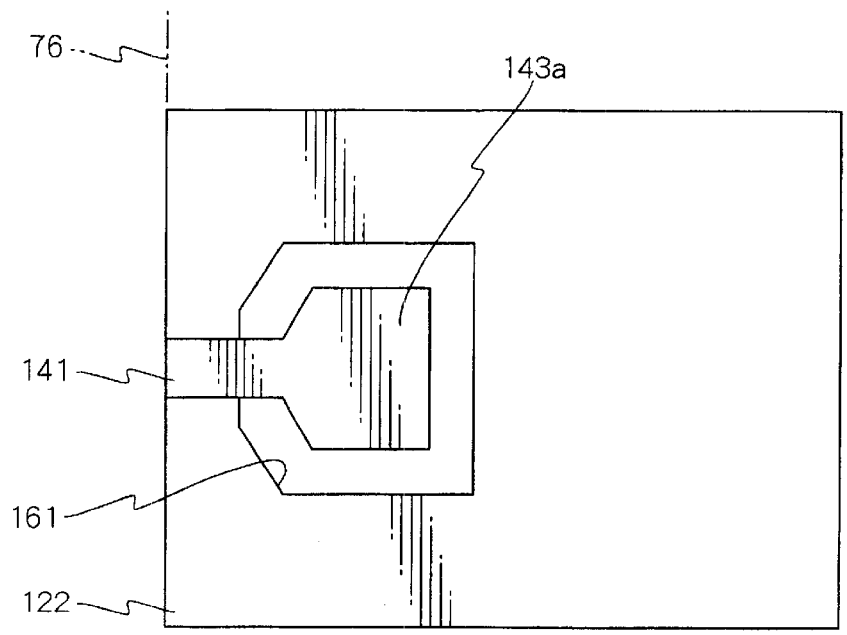
FIG. 7 is a partially-omitted top view of a second embodiment (concave-portion corner shape) of a thin-film magnetic head of the present invention.

FIG. 7 is a partially-omitted top view of the second embodiment (concave-portion corner shape) of a thin-film magnetic head of the present invention. The second embodiment will be described below by referring to FIG. 7.

Figure 8:
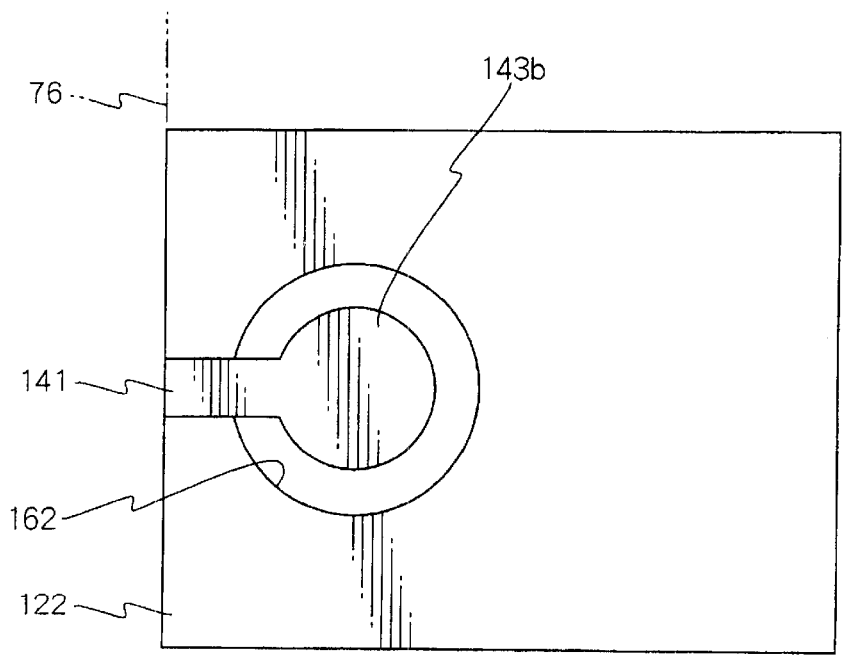
FIG. 8 is a partially-omitted plan view showing a third embodiment (circular concave portion) of a thin-film magnetic head of the present invention.

In the process shown in FIG. 3 (c) , the horizontal cross section of the concave portion 16 formed on the shared pole layer 122 is rectangular. However, the margin of the concave portion 161 of this embodiment at the ABS plane-76 side becomes narrower toward the ABS plane 76 as shown in FIG. 8. Thereby, it is possible to reduce the magnetic reluctance. In this case, the size of a junction 143a is made smaller than the size of outer line of the concave portion 161. Thereby, because leak of magnetic flux can be limited, an inductive recording head having a high magnetic recording efficiency is obtained.

FIG. 8 is a partially-omitted top view of the third embodiment (circular concave portion) of a thin-film magnetic head of the present invention. The third embodiment will be described below by referring to FIG. 8.

As for the concave portion 162 of this embodiment, the horizontal cross section is almost circular as shown in FIG. 9. Thereby, it is possible to further reduce the magnetic reluctance. In this case, a junction 143b is formed into a circle smaller than the size of outer line of the concave portion 162. Thereby, leak of magnetic flux can be limited and an inductive recording head having a high magnetic recording efficiency is obtained.

Figure 9A:
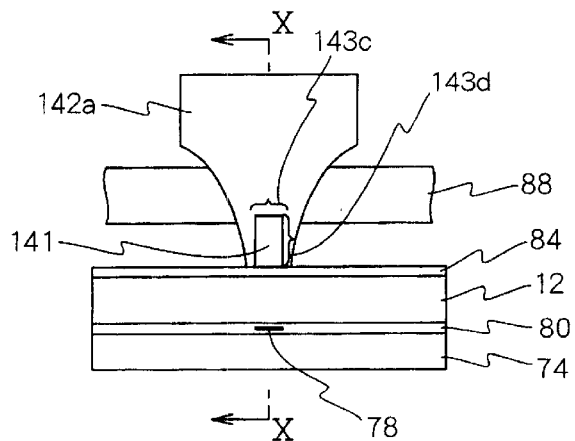
FIG. 9(*a*) to FIG. 9(*c*) show a fourth embodiment (junction overlap) of a thin-film magnetic head of the present invention, in which FIG. 9(*a*) is a partially-omitted front view, FIG. 9(*b*) is a longitudinal sectional view taken along the line X—X of FIG. 9(*a*), and FIG. 9(*c*) is a partially-omitted top view.
Figure 9B:
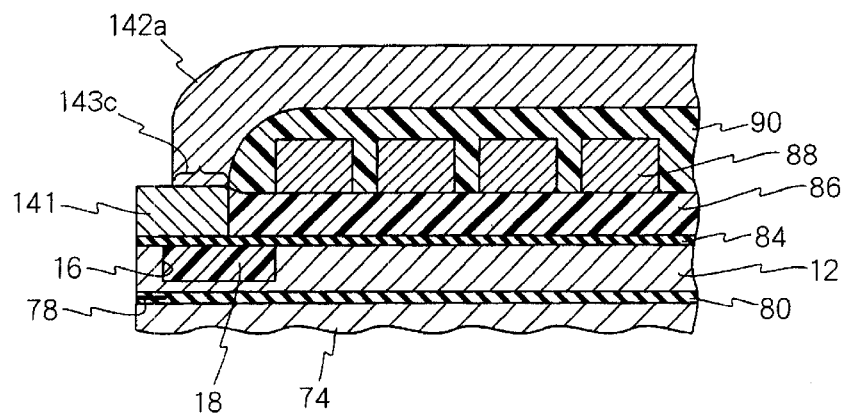
Figure 9C:
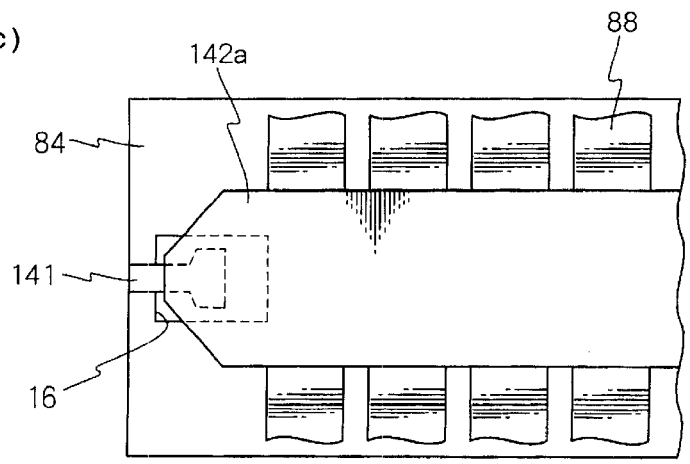

FIGS. 9(a) to 9(c) show the fourth embodiment (junction overlap) of a thin-film magnetic head of the present invention, in which FIG. 9(a) is a partially-omitted front view, FIG. 9(b) is a longitudinal sectional view taken along the line X—X of FIG. 9(a), and FIG. 9(c) is a partially-omitted top view. The fourth embodiment is described below by referring to FIGS. 9(a) to 9(c).

A yoke portion 142a is connected to a front end portion 141 through junctions 143c and 143d. The junction 143c serves as the upper side of the front end portion 141 and the junction 143d serves as the both lateral sides of the front end portion 141. That is, the yoke portion 142a covers the outer periphery of the front end portion 141 and also contacts a write gap layer 84. According to this embodiment, because a junction has a large contact area, it is possible to reduce the magnetic reluctance of the junction. Moreover, there is a large-enough allowance for the connection accuracy for connecting the yoke 142a with the front end portion 141. Moreover, even using the shape explained above, the shape of a portion for determining the track width of the front end 141 portion is not changed. Therefore, the magnetic domain structure is not influenced by the shapes of the junctions 143c and 143d.

Figure 10:
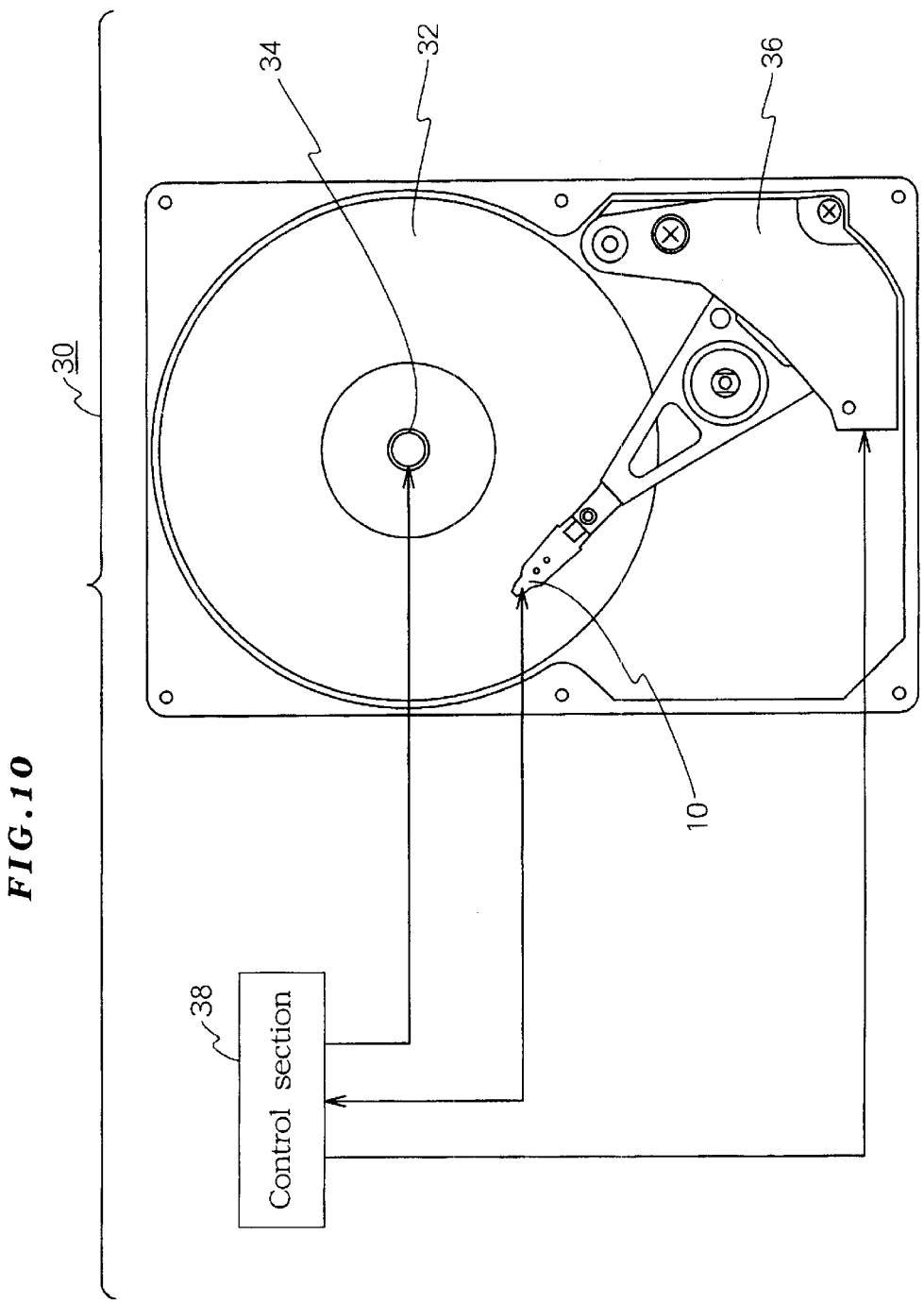
FIG. 10 is a schematic block diagram showing an embodiment of a magnetic storage apparatus using a thin-film magnetic head of the present invention.
Figure 11:
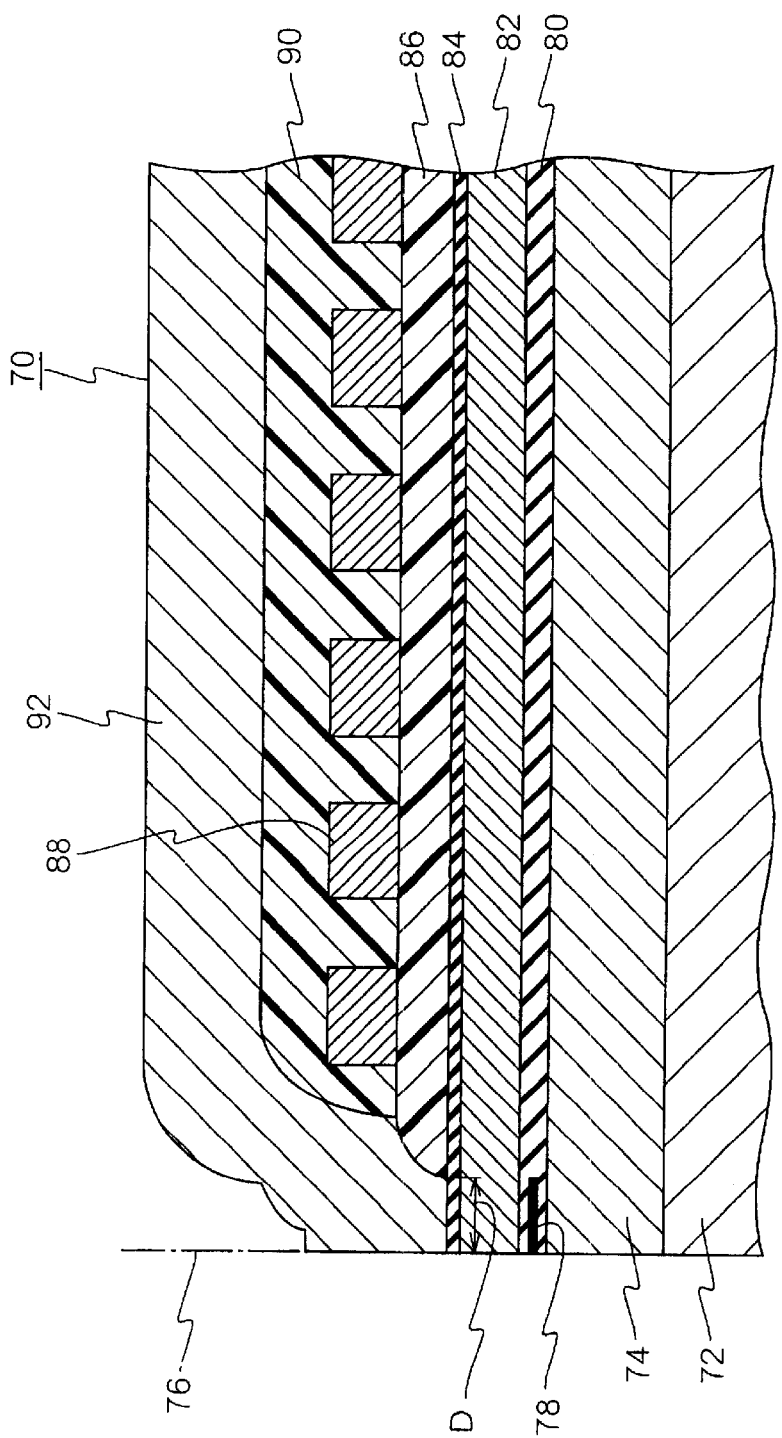
FIG. 11 is a sectional view showing a conventional thin-film magnetic head.

FIG. 10 is a schematic block diagram showing an embodiment of a magnetic storage apparatus using a thin-film magnetic head of the present invention. The embodiment will be described below by referring to FIG. 10.

The magnetic storage apparatus 30 of this embodiment is configured of the thin-film magnetic head 10 of the first embodiment, a magnetic storage medium 32, a spindle motor 34 for rotating the magnetic storage medium 32, a voice coil motor 36 for moving the thin-film magnetic head 10 on the magnetic storage medium 32, and a control section 38 to be operated in accordance with a command output from a not-illustrated host system. The control section 38 drives the spindle motor 34 and the voice coil motor 36 and moreover, records or reproduces data in or from the magnetic storage medium 32 by the thin-film magnetic head 10.

Because the magnetic recorder of this embodiment uses the thin-film magnetic head 10, the recording track width is 1.2 [micron meter] or less. A recording density to be realized by the track width is 4 Gbits/(inch) 2 or more. Therefore, by using a 3.5"-diameter disk, it is possible to easily provide a magnetic recorder having a high recording density of 5 Gbytes per disk or more.

Moreover, it is needless to say that the present invention is not restricted to the above embodiment. For example, a thin-film magnetic head of the present invention can use not only an MR-inductive composite-type thin-film magnetic head but also a thin-film magnetic head configured of only the inductive type or a composite-type thin-film magnetic head constituted by combining a reproducing head other than the MR type with an inductive-type recording head. Moreover, a lower shielding layer can use not only an NiFe plated film but also a sputtered film made of FeAlSi, CoZrTa, or FeTaN.

According to a thin-film magnetic head of the present invention, it is possible to make the magnetizing direction of a front end portion vertical to a signal magnetic field because magnetic easy axis of the front end portion of an upper pole layer along an ABS plane is adjusted to the film thickness direction and thereby, realize the magnetic-field/magnetization arrangement in the magnetization rotation mode. Therefore, it is possible to avoid the magnetic-field/magnetization arrangement in the magnetic-domain-wall moving mode caused when realizing a narrow track by the prior art and thereby, it is possible to improve the high-frequency characteristic of an excitation magnetic field response when realizing a narrow track.

Moreover, because a concave portion is formed on a lower pole layer or shared pole layer at a position separated from an ABS plane, the concave portion is filled with a nonmagnetic material, and a gap depth is determined by the concave portion, the gap depth is not determined by the distance from the ABS plane up to the front end of a first flattening layer. Therefore, because it is possible to greatly separate the first flattening layer from the ABS plane. Also, it is possible that a resist frame pattern for forming the front end portion of an upper pole layer is not increased in film thickness due to the height difference of the first flattening layer or it is not overexposed due to the light reflected from the first flattening layer. Accordingly, it is possible to accurately decrease a gap depth and a front end portion width and thereby, a narrow track can be easily achieved. For example, as for the prior art, forming a track width of 1.7 [micron meter] through exposure to g-line of Hg is the limit. However, the present invention makes it possible to easily form a track width of 1.2 [micron meter]. By applying the stepper system (reduced projection developing system) using i-line of Hg to the present invention, it is possible to form a submicron narrow-track recording-pole front end portion of 0.8 [micron meter] or less.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-173304 (Filed on Jun. 19, 1998) including specification, claims, drawings and summary are incorporated herein by reference in its entirety.

What is claimed is:

1. A thin-film magnetic head comprising:
    a write gap layer formed on a lower pole layer, and a first flattening layer, a coil pattern layer, and a second flattening layer laminated in order on the write gap layer excluding the vicinity of an ABS plane; and an upper pole layer formed on the write gap layer at least nearby the ABS plane, wherein the upper pole layer is configured of a front end portion facing to the ABS plane and a yoke portion connected to the front end portion through a junction, wherein magnetic easy axis at the front end portion at the ABS plane is oriented in the film thickness direction of the front end portion; and
    wherein a concave portion is formed in a recess in the upper of the two pole piece layers at a position separated form the ABS plane, the concave portion is filled with nonmagnetic material, the gap depth between the upper pole layer and the lower pole layer is determined by the concave portion, and the margin of the concave portion near the ABS-plane becomes narrower toward the ABS plane.

2. The thin-film magnetic head according to claim 1, wherein at least the front end portion of the upper pole layer is made of a material having a saturation flux density of 1.6 T or more.

3. The thin-film magnetic head according to claim 1, wherein the front end portion on an ABS plane has a film thickness t and a front end portion width W vertical to the direction of the film thickness t meeting the relation t>W.

4. The thin-film magnetic head according to claim 1, wherein the front end portion on an ABS plane has a film thickness t and a front end portion width W vertical to the direction of the film thickness t meeting the relation t>3W.

5. A magnetic storage apparatus comprising:
    the thin-film magnetic head of claim 1;
    a magnetic storage medium; and
    driving means for causing a relative motion between the magnetic storage medium and the thin-film magnetic head.

6. The magnetic storage apparatus according to claim 5, wherein the magnetic storage medium has a track width of 1.2 [micron meter ] or less.

* * * * *